United States Patent Office 2,868,622
Patented Jan. 13, 1959

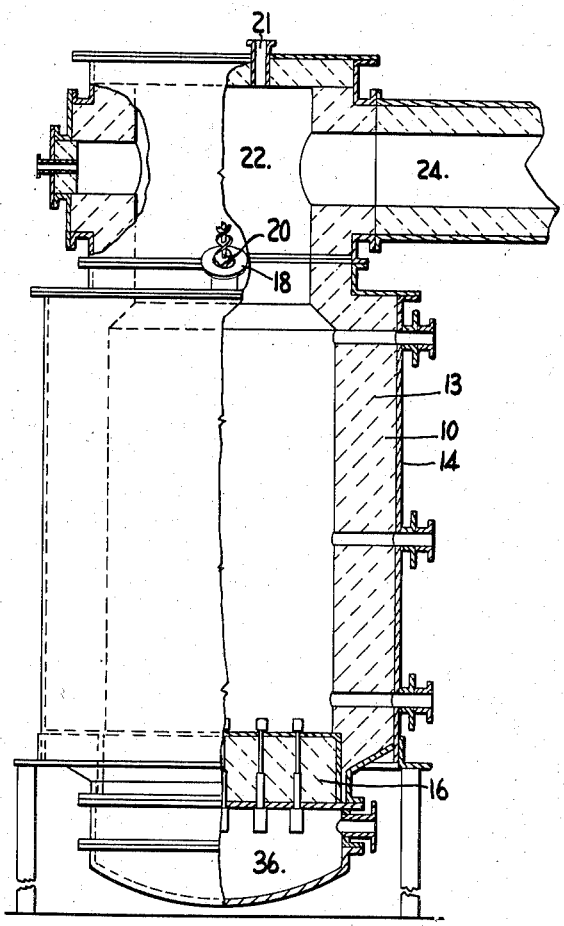

2,868,622

CHLORINATION OF TITANIFEROUS MATERIALS

Arthur Neville Copnall Bennett and James Dennis Groves, Stockton-on-Tees, England, assignors to British Titan Products Company Limited, Billingham, England, a British company Application February 13, 1956, Serial No. 564,867

Claims priority, application Great Britain August 19, 1953

15 Claims. (Cl. 23—87)

This invention is for improvements in or relating to the chlorination of titaniferous materials.

In the chlorination of certain titaniferous materials such as mineral rutile and ilmenite in the presence of carbon, the reaction is highly exothermic. In small scale operation the loss of heat from the reaction chamber is such that it becomes difficult to maintain the normal chlorination temperatures of 850 to 950° C. and, in consequence, various devices have been instituted to provide auxiliary heating either by external indirect heating, i. e. by maintaining the walls of the reaction chamber at an elevated temperature by means of electrical heating, preheating of the chlorination gases, or by use of internal heaters such as an arc or, preferably, by introducing gases such as air or oxygen in order to react with excess carbon to supply the necessary heat. The reaction chamber is, however, usually, of necessity, lined with refractory material which will withstand attack by chlorine and associated gases at the temperatures involved. This material is usually of a heat insulating type and, in consequence, the heat losses to the surroundings by conduction through the walls is limited. It will be obvious that these losses will be greater with a small chamber as compared with a larger one of similar shape and design. Thus in stepping up production capacity the need for supplying sufficient heat to maintain reaction is reduced and, furthermore, as the increase in size progresses, a stage is reached when the chamber no longer requires auxiliary heat and the heat generated by the reaction becomes more than sufficient to maintain the materials at the preferred reaction temperatures. Overheating is moreover developed and additional problems arise e. g. corrosion of the furnace walls, sintering of the mass, blockage or partial blockage, of the device used for distribution of chlorine with consequent inefficient reaction, or sometimes even reaction of the mass with the furnace walls, tending to sintering. This state of affairs is particularly objectionable in the chlorination of titaniferous materials admixed with carbonaceous or other solid reducing material or, where the chlorination is conducted in the presence of reducing gases such as carbon monoxide in shaft chambers or zones or especially where fluid bed techniques are employed.

It is an object of the present invention to provide a simple and efficient means for the prevention of overheating during the fluid bed chlorination of titaniferous materials otherwise generating excess heat which would raise the temperature above the optimum conditions for chlorination.

It is a further object of the invention to provide a fluid bed process for the chlorination of titaniferous materials which may be conducted on a large scale with a minimum plant requirement.

According to the invention there is provided a process for the chlorination of a titaniferous material in a fluid bed reactor employing a solid or gaseous reducing agent in which the heat generated is in excess of that required to maintain an operating temperature within the reaction zone wherein an inert material which does not undergo chemical change during the chlorination reaction but which volatilises is added to the reactor to control the temperature.

The preferred temperature range is from 850 to 1000° C.

The inert material is preferably liquid titanium tetrachloride, i. e. one of the constituents of the chlorination reaction which may be removed in the subsequent cooling and condensing system. Silicon tetrachloride or tin tetrachloride may also be employed. Solid halides which will evaporate under the temperature conditions existing during chlorination may also be used, such as ferric chloride or solutions or suspensions of such solid halides in liquid halides, which may be derived from the condensation of chlorination gases instead of or in addition to the titanium tetrachloride. The addition of such inert materials removes heat from the reactor not only by a rise in temperature taking advantage of the specific heat but also by latent heat of evaporation. The use of titanium tetrachloride, ferric chloride or admixtures of these materials is obviously preferable, since their removal at a later stage does not constitute an extra operation.

By use of the present invention control may be rapid and quickly effective and the exit gases from the chlorinator may be maintained under steady conditions both with respect to temperature and rate of discharge; the invention is readily adapted to automatic controls.

The addition of the titanium tetrachloride to effect cooling in the chlorinator has a very small effect on the dew point of the gases which subsequently emerge.

The process may more particularly be understood by the following description:

Methods of chlorinating titaniferous materials of the type of mineral rutile or ilmenite by the fluid bed technique have previously been described. These methods are, however, restricted to certain conditions of chlorination such as, for instance, the complete or substantially complete chlorination of the raw material feed and to the conduct of chlorination in one stage and/or over a relatively wide range of temperature. In the present process, a chlorinator of similar construction is employed but the dimensions are greater and particularly the cross sectional area or the diameter of the shaft are substantially larger. The raw material consists of mineral rutile, ilmenite, or other titanium bearing materials with carbon (e. g. 10 to 30% by weight carbon on the weight of the titanium bearing material) or the equivalent proportion of reducing agent either solid or gaseous, e. g. carbon monoxide, may be used. The invention is applicable to a wide range of the mixtures of the kind above described where the heat evolved is greater than is sufficient to maintain the temperature of the bed within the desired range, usually 850 to 1100° C. These raw materials contain essentially titanium oxide with varying proportions of iron as oxide in varying degrees of oxidation. Small proportions of other materials may be included in these ores of which the following mainly in the form of oxides or oxidic compounds are the most common: Silicon, aluminum, chromium, tantalum, vanadium, niobium and zirconium.

In the chlorine attack on these raw materials, some of the impurities (particularly the iron), will be substantially chlorinated, the degree of chlorination varying according to the state of combination or to the temperature of chlorination. Thus, it frequently happens that in operating at temperatures below 950° C. the zirconium constituent is not chlorinated and will remain in the bed. In a similar way, silica or silicious materials will undergo increasing attack as the temperature is increased, so that by employing a limited temperature range, the proportion of silica which is chlorinated may be kept within reasonably low limits. These desirable features are attained by controlling the temperature, particularly where a large scale plant is involved or where the lagging is such that the excess heat cannot be dissipated, by the admission of an inert liquid such as titanium tetrachloride which will evaporatively cool the bed, if necessary, at a very rapid rate. The method of introducing the titanium tetrachloride is simple and, whilst the liquid may be introduced at any level in the reaction zone, that is above or below the level of the fluidised mass, it is preferably admitted as a stream near the top of the shaft furnace. It is apparent that the admission of titanium tetrachloride to a hot furnace bed in this way is tantamount to a flash evaporation so that wherever admitted the liquid does not attain a condition whereby any of the moving particulate matter may be aggregated or substantially wetted and thus impede free movement in the mobile bed. It is further apparent that with suitable temperature recording devices, e. g. a pyrometer, the temperature of the bed may actuate an automatic titanium tetrachloride feeding device so that the quantity directly admitted at any given time is related to the temperature of the reaction chamber.

Whilst cooling the bed in this way will proportionately increase the volume of gases leaving the reaction chamber, this will not, as in the case where cooling is effected by inert gases fed below and through the bed, substantially interfere with the efficient fluidisation of the e. g. titaniferous mass. The increase in volume of the gases leaving the chlorinator will require slightly larger cooling and condensing equipment but this increase will be much less than when cooling of the chlorinator is effected by the use of inert gases. It will also be seen that the ultimate waste gases from the reaction will not be increased by the application of this invention. Thus, the uncondensed gases after cooling which may require treatment for the removal of traces of titanium tetrachloride and for the removal of obnoxious impurities, prior to discharge to the atmosphere, will be a minimum, i. e. they will not be increased by the operation of this invention as they would if inert gas coolants were used.

Following is a description by way of example of methods of carrying the invention into effect. The furnace 10 used is illustrated in the accompanying drawing.

*Example I*

A shaft furnace 10 ft. high and 4.8 ft. inside diameter was lined with chlorine resisting brickwork 13 inside a steel shell 14, which had an outside diameter of 9 ft. At the base of the shaft was a perforated plate 16 which afforded a substantially gas permeable solids impermeable barrier producing a pressure drop not less than the drop in pressure in the bed. This plant was constructed to allow for a 3 ft. high fluidised bed consisting of mineral rutile and carbon to be maintained in fluidised state by chlorine admitted below the bed.

The solid materials were fed through inlet 18 into the bed (by means of a screw feeder 20) through the side and immediately above the bed of the reaction chamber. Through the roof section 22 of the reaction chamber or zone there were provided two ports, one, 21, for admission of liquid titanium tetrachloride directed downward towards the bed, the other, 24, through which the gaseous products of reaction were discharged. The chlorine from a vaporiser at a temperature of 30° to 50° C. was fed into a manifold 36 located below the perforated plate and passed through this plate into the fluidised bed supported above it.

Into the reaction chamber of the furnace was introduced via the screw feeder a mixture of mineral rutile ore containing 95% $TiO_2$, 1.5% $Fe_2O_3$, 0.3% $Al_2O_3$, 1% $V_2O_5$, 0.8% $SiO_2$ and 0.6% $Cr_2O_3$ and having a size range of 100/150 microns and an excess of coke, the average size of which is larger than the average size of the ore. This mixture was pre-heated by reaction of oxygen containing gases fed through the perforated plate with excess coke in the mixture, the oxygen containing gases serving also to fluidise the bed. In this way, the temperature of the bed was raised to 870° C. The bed was adjusted to contain about four parts of mineral rutile to one of coke whereupon the oxygen supply was cut off and chlorine was admitted to the bed at the rate of 650 kilos/hr. Meanwhile, mineral rutile admixed with coke in the proportion of 4:1 was fed into the furnace at the rate of 400 kilos of mineral rutile per hour.

Coincident with these additions was the introduction of liquid titanium tetrachloride at 20 to 40° C. which was fed directly to the bed through a stainless steel pipe 21 maintained cool at the point of entry by the circulation of titanum tetrachloride liquid. The introduction of this titanium tetrachloride to the bed enabled the temperature of the latter to be maintained at 870 to 900° C. The gases which emerged from the chlorinator contained titanium tetrachloride, ferric chloride and other halides in small proportions, together with carbon dioxide and carbon monoxide. In addition there was some carbon dust and ash carried over by entrainment. The bed was intermittently purged through a downflow leg in an amount corresponding to 3% of the quantity of rutile fed in. The gases discharged from the furnace were subsequently cooled to condense the solid constituents, particularly ferric chloride, and to condense the liquid titanium tetrachloride, according to known procedures. This operation was conducted for 67 days and during this period the operation was continuous, the overall production of titanium tetrachloride averaging 1100 kilos/hr. An examination of the plant at the end of the run indicated that there was no aggregation leading to building up or blocking of the bed and no deterioration of the brick work.

The titanium tetrachloride recirculated for cooling the bed may be a relatively pure liquid but more frequently will consist of a comparatively crude intermediate product which may be in admixture with silicon tetrachloride, tin tetrachloride or other liquid chlorides which are miscible therein or it may contain normally solid chlorides either in solution, e. g. aluminium chloride and vanadium chloirde or zirconium chloride or it may contain suspensions of these and other chlorides (especially ferric chloride.

*Example II*

Employing the apparatus described in Example I a similar operation was carried out, but in this case the cooling was achieved by the addition of solid ferric chloride. Because solid ferric chloride is extremely hygroscopic and it is most important to keep water out of the reaction chamber, extra precautions had to be taken in the handling of ferric chloride. The vessel initially containing the ferric chloride was constructed in stainless steel and the ferric chloride was maintained in an agitated condition by blowing through it a dry inert gas. The solid ferric chloride was fed to the chlorinator by means of a feeder which consisted of a fluidised U tube of ferric chloride. From the U tube ferric chloride was fed into a dip pipe suspended from the top of the furnace which was constructed in silica and which fed the solid material to the surface of the fluid bed reaction. With this device 730 kgs. an hour of ferric chloride was added at the same time as 630 kgs. of a mixture in the ratio of 4:1 of solid rutile and coke. By this means the temperature was maintained at between 900 and 930° C.

The gases discharged from the furnace were subsequently cooled to condense the solid constituents, principally ferric chloride, which discharged from the condensing apparatus into a sealed vessel from which it was transferred, without being in contact with atmospheric moisture, back to the stainless steel feed hopper described above.

Example III

Into the reaction chamber of the furnace described in Example I was introduced via the screw feeder a mixture of mineral rutile ore having the analysis given in Example I and having a size range of 90 to 250μ and an excess of coke containing 98% carbon of size 800 micron to dust 80% being between 100 to 600 micron. This mixture was pre-heated by reaction of oxygen containing gases fed through the perforated plate with excess coke in the mixture, the oxygen-containing gases serving also to fluidise the bed. In this way the temperature of the bed was raised to 900° C. The bed was adjusted to contain about 4 parts of mineral rutile to 1 part of coke whereupon the oxygen supply was cut-off and chlorine was admitted to the bed at the rate of 1500 lbs. of chlorine per hour. Meanwhile mineral rutile of the composition given above was fed at the rate of 850 lbs. per hour and admixed with coke, as specified, at the rate of 180 lbs. per hour. At the same time a slurry of iron chloride in liquid titanium tetrachloride was introduced in such a way that the bed was maintained at between 900 to 920° C. The amount introduced in this way was 500 lbs. per hour of liquid titanium tetrachloride and 20 lbs. per hour of solid ferric chloride. The gases emerging from the chlorinator were handled as in Example I and at the end of the operation which was continued for eleven days it was found on examination of the plant that there was no aggregation leading to building up or blocking of the bed.

This application is a continuation-in-part of our earlier United States application, Serial No. 449,002, filed August 10, 1954, and now abandoned.

We claim:

1. In the method of chlorinating titanium bearing materials in a reaction zone whereby heat is evolved and titanium tetrachloride is formed and vaporized, the improvement which comprises conducting said reaction at a rate in excess of the rate at which heat evolved by the reaction is removed from the reaction zone by conduction, radiation, and convection, whereby the temperature of the reaction zone tends to rise, and preventing excessive rise of the temperature of said zone by introducing therein a metal chloride in an unvaporized state, which chloride vaporizes at a temperature above 50° C. and below 800° C., the amount of said chloride so introduced being large enough to effect substantial cooling of the reaction zone.

2. In the method of chlorinating titanium bearing materials in a reaction zone whereby heat is evolved and titanium tetrachloride is formed and vaporized, the improvement which comprises conducting said reaction at a rate in excess of the rate at which heat evolved by the reaction is removed from the reaction zone by conduction, radiation, and convection, whereby the temperature of the reaction zone tends to rise, and preventing excessive rise of the temperature of said zone by introducing therein liquid titanium tetrachloride.

3. In the method of chlorinating titanium bearing materials in a reaction zone whereby heat is evolved and titanium tetrachloride is formed and vaporized, the improvement which comprises conducting said reaction at a rate in excess of the rate at which heat evolved by the reaction is removed from the reaction zone by conduction, radiation, and convection, whereby the temperature of the reaction zone tends to rise, and preventing excessive rise of the temperature of said zone by introducing therein a solid iron halide.

4. In the method of chlorinating titanium bearing materials in a reaction zone whereby the heat is evolved and titanium tetrachloride is formed and vaporized, the improvement which comprises conducting said reaction at a rate in excess of the rate at which heat evolved by the reaction is removed from the reaction zone by conduction, radiation, and convection, whereby the temperature of the reaction zone tends to rise, and preventing excessive rise of the temperature of said zone by introducing therein solid ferric chloride.

5. In the method of chlorinating titanium bearing materials in a reaction zone whereby heat is evolved and titanium tetrachloride is formed and vaporized, the improvement which comprises conducting said reaction at a rate in excess of the rate at which heat evolved by the reaction is removed from the reaction zone by conduction, radiation, and convection, whereby the temperature of the reaction zone tends to rise, and preventing excessive rise of the temperature of said zone by introducing therein liquid ferrous chloride.

6. In the method of chlorinating titaniferous material in a fluidized bed of titanium bearing material suspended in a gaseous chlorinating agent at a temperature of 850–1100° C., the improvement which comprises introducing chlorinating gas and titanium bearing material into said bed at a rate such that the heat generated in the bed is in excess of that required to maintain the temperature of the bed in the range of 850–1100° C., and preventing overheating of the bed by introducing therein a metal chloride in an unvaporized state which vaporizes at a temperature above 50° C. and below 800° C.

7. The process of claim 6 wherein the metal chloride is liquid titanium tetrachloride.

8. In a method of preparing titanium tetrachloride by chlorinating a titanium bearing material in a reaction bed in which titanium tetrachloride is formed and vaporized therefrom and heat of reaction is liberated, the improvement which comprises conducting the chlorination at a rate such that the heat evolved tends to overheat the bed, and cooling the bed by introducing therein titanium tetrachloride which vaporizes at the temperature of chlorination and absorbs heat from the bed by virtue of such vaporization.

9. In the method of chlorinating titanium bearing materials in a reaction zone whereby heat is evolved, the improvement which comprises establishing a fluidized bed of the titanium bearing material in an upwardly rising stream of chlorine, conducting the reaction at a rate such that a substantial amount of heat is evolved, and consuming at least a portion of said heat by directing a stream of liquid titanium tetrachloride from a point above the top of the fluidized bed into the vapor space immediately above the bed and toward the top of said bed.

10. The process of claim 2 wherein a mixture of titanium tetrachloride and iron chloride produced by condensation of vapors produced by the chlorination is introduced into the reaction zone.

11. The process of claim 1 wherein the metal chloride is tin tetrachloride.

12. The process of claim 1 wherein the metal chloride is silicon tetrachloride.

13. The process of claim 1 wherein the metal chloride is a liquid metal chloride.

14. The process of claim 13 wherein the chlorination of the titanium bearing material is conducted in a fluidized bed.

15. In the method of chlorinating titanium bearing materials in a reaction zone whereby heat is evolved, the improvement which comprises establishing a fluidized bed of the titanium bearing material in an upwardly rising stream of chlorine, conducting the reaction at a rate such that a substantial amount of heat is evolved, and consuming at least a portion of said heat by directing a stream of liquid metal chloride from a point above the top of the fluidized bed into the vapor space immediately above the bed and toward the top of said bed.

References Cited in the file of this patent

UNITED STATES PATENTS 2,701,180    Krchma _____ Feb. 1, 1955